US009664516B2

(12) United States Patent
Song et al.

(10) Patent No.: US 9,664,516 B2
(45) Date of Patent: May 30, 2017

(54) INERTIAL SENSING DEVICE

(71) Applicant: SZ DJI TECHNOLOGY CO., LTD, Shenzhen, Guangdong (CN)

(72) Inventors: Jian yu Song, Shenzhen (CN); Ren li Shi, Shenzhen (CN); Tao Wang, Shenzhen (CN)

(73) Assignee: SZ DJI TECHNOLOGY CO., LTD., Shenzhen (CN)

( * ) Notice: Subject to any disclaimer, the term of this patent is extended or adjusted under 35 U.S.C. 154(b) by 0 days.

(21) Appl. No.: 14/390,008

(22) PCT Filed: Apr. 25, 2014

(86) PCT No.: PCT/CN2014/076296
§ 371 (c)(1),
(2) Date: Oct. 1, 2014

(87) PCT Pub. No.: WO2015/161517
PCT Pub. Date: Oct. 29, 2015

(65) Prior Publication Data
US 2017/0030715 A1 Feb. 2, 2017

(51) Int. Cl.
G01P 1/00 (2006.01)
G01C 19/5783 (2012.01)
(Continued)

(52) U.S. Cl.
CPC ........ G01C 19/5783 (2013.01); B64C 39/024 (2013.01); G01C 19/00 (2013.01);
(Continued)

(58) Field of Classification Search
CPC ...................................................... G01P 1/023
(Continued)

(56) References Cited

U.S. PATENT DOCUMENTS 5,038,613 A 8/1991 Takenaka et al.
5,239,866 A 8/1993 Froidevaux
(Continued)

FOREIGN PATENT DOCUMENTS

CN 1322312 C 6/2007
CN 100381785 C 4/2008
(Continued)

OTHER PUBLICATIONS

Barton, et al. Design, Fabrication and Testing of Miniaturized Wireless Inertial Measurement Units (IMU). 2007 Electronic Components and Technology Conference, pp. 1143-1148. Published Dec. 31, 2007.
(Continued)

Primary Examiner — Clayton E Laballe
Assistant Examiner — Kevin Butler
(74) Attorney, Agent, or Firm — Wilson Sonsini Goodrich & Rosati

(57) ABSTRACT

Improved sensing devices are provided for determining the spatial disposition of a movable object. In one aspect, an apparatus for determining a spatial disposition of a movable object comprises: a support base configured to be carried by a movable object; one or more accelerometers coupled to the support base via a first damping element configured to damp motion of the one or more accelerometers; and one or more gyroscopes coupled to the support base via a second damping element configured to damp motion of the one or more gyroscopes, wherein an amount of motion damping provided by the first damping element is greater than an amount of motion damping provided by the second damping element.

20 Claims, 7 Drawing Sheets

(51) Int. Cl.

| | | |
|---|---|---|
| *G01C 19/00* | (2013.01) | |
| *G01P 15/00* | (2006.01) | |
| *B64C 39/02* | (2006.01) | |
| *G01C 19/04* | (2006.01) | |
| *G01P 15/08* | (2006.01) | |
| *G01P 1/02* | (2006.01) | |
| *G01P 15/18* | (2013.01) | |

(52) U.S. Cl.
CPC .............. *G01C 19/04* (2013.01); *G01P 15/00* (2013.01); *B64C 2201/127* (2013.01); *G01P 1/02* (2013.01); *G01P 1/023* (2013.01); *G01P 15/08* (2013.01); *G01P 15/0802* (2013.01); *G01P 15/18* (2013.01)

(58) Field of Classification Search
USPC .......................................................... 73/493
See application file for complete search history.

(56) References Cited

U.S. PATENT DOCUMENTS

| | | | |
|---|---|---|---|
| 5,433,110 | A | 7/1995 | Gertz et al. |
| 6,195,261 | B1 | 2/2001 | Babutzka et al. |
| 6,918,297 | B2 | 7/2005 | MacGugan |
| 7,040,922 | B2 | 5/2006 | Harney et al. |
| 7,370,530 | B2 | 5/2008 | DCamp et al. |
| 7,404,324 | B2 | 7/2008 | Braman et al. |
| 7,467,552 | B2 | 12/2008 | MacGugan |
| 7,536,909 | B2 | 5/2009 | Zhao et al. |
| 7,814,791 | B2 | 10/2010 | Andersson et al. |
| 8,037,754 | B2 | 10/2011 | Eriksen et al. |
| 8,266,960 | B2 | 9/2012 | Braman et al. |
| 8,371,534 | B1 | 2/2013 | Goodzeit et al. |
| 8,552,350 | B2 | 10/2013 | Bielas et al. |
| 8,640,541 | B2 | 2/2014 | Abdel Aziz et al. |
| 8,646,331 | B2 | 2/2014 | Ohl et al. |
| 8,960,000 | B2 | 2/2015 | Sakuma et al. |
| 9,213,046 | B2 | 12/2015 | Wang |
| 2003/0070483 | A1 | 4/2003 | Mueller |
| 2004/0169244 | A1 | 9/2004 | MacGugan |
| 2005/0039529 | A1 | 2/2005 | Jeanroy et al. |
| 2007/0032951 | A1 | 2/2007 | Tanenhaus et al. |
| 2007/0113702 | A1 | 5/2007 | Braman et al. |
| 2009/0255335 | A1 | 10/2009 | Fly et al. |
| 2009/0308157 | A1 | 12/2009 | Eriksen et al. |
| 2010/0037694 | A1 | 2/2010 | Grossman |
| 2010/0059911 | A1 | 3/2010 | Goepfert et al. |
| 2012/0032286 | A1 | 2/2012 | Trusov et al. |
| 2013/0110325 | A1 | 5/2013 | Sapp, II et al. |
| 2013/0111993 | A1 | 5/2013 | Wang |
| 2016/0097793 | A1 | 4/2016 | Wang |

FOREIGN PATENT DOCUMENTS

| | | |
|---|---|---|
| CN | 101290227 A | 10/2008 |
| CN | 101349564 A | 1/2009 |
| CN | 101532840 A | 9/2009 |
| CN | 201408009 Y | 2/2010 |
| CN | 101750065 A | 6/2010 |
| CN | 101922938 B | 6/2012 |
| CN | 202274882 U | 6/2012 |
| CN | 102778232 A | 11/2012 |
| CN | 102980584 A | 3/2013 |
| CN | 203037259 U | 7/2013 |
| CN | 103411615 A | 11/2013 |
| DE | 4136355 A1 | 5/1993 |
| DE | 102005047873 A1 | 4/2007 |
| DE | 602004006270 T2 | 1/2008 |
| EP | 1642365 B1 | 5/2007 |
| EP | 1530057 B1 | 2/2010 |
| EP | 2154393 A2 | 2/2010 |
| EP | 2752643 A1 | 7/2014 |
| JP | S63217787 A | 9/1988 |
| JP | H0570001 A | 3/1993 |
| JP | H05149381 A | 6/1993 |
| JP | H 07-306047 A | 11/1995 |
| JP | 2002-195834 A | 7/2002 |
| JP | 2002299545 A | 10/2002 |
| JP | 2013540987 A | 11/2013 |
| JP | 2014013207 A | 1/2014 |
| WO | WO 03/029756 A1 | 4/2003 |
| WO | WO 2004/079874 A1 | 9/2004 |
| WO | WO 2009/129066 A2 | 10/2009 |
| WO | WO 2013/029286 A1 | 3/2013 |

OTHER PUBLICATIONS

International search report dated May 5, 2011 for PCT/CN2010/079483.
International search report and written opinion dated Feb. 6, 2015 for PCT/CN2014/076296.
U.S. Appl. No. 14/940,721, filed Nov. 13, 2015, Wang.
European search report and search opinion dated Jan. 4, 2017 for EP Application No. 14889856.2.
Gavrilets, et al. Avionics system for a small unmanned helicopter performing aggressive maneuvers. Digital Avionics Systems Conference, 2000. Proceedings. DASC. The 19th. vol. 1. IEEE, Oct. 2000.
Loewen, Howard. Isolating Components from UAV Vibration. MicroPilot. Jan. 2013. Available at https://www.micropilot.com/pdf/isolating-components-uav-vibration.pdf. Accessed Dec. 22, 2016.
Office action dated Nov. 3, 2016 for U.S. Appl. No. 14/940,721.
Reitsma, Maj Chris. A novel approach to vibration isolation in small, unmanned aerial vehicles. InTechnologies for Practical Robot Applications, 2009. TePRA 2009. IEEE International Conference on Nov. 9, 2009 (pp. 84-87).
Office action dated Apr. 10, 2015 for U.S. Appl. No. 13/809,407.
Notice of allowance dated Sep. 23, 2015 for U.S. Appl. No. 13/809,407.
Notice of allowance dated Oct. 6, 2015 for U.S. Appl. No. 13/809,407.
Barton, et al. "Design, Fabrication and Testing of Miniaturised Wireless Inertial Measurement Units (IMU)," 2007 Preceedings 57th Electronic Components and Technology Conference, Reno, NV, 2007, pp. 1143-1148.

INERTIAL SENSING DEVICE

BACKGROUND

Unmanned vehicles such as unmanned aerial vehicles can be used for performing surveillance, reconnaissance, and exploration tasks for military and civilian applications. An unmanned vehicle may be capable of navigating autonomously or semi-autonomously within an environment. In some instances, an unmanned vehicle may include various sensing devices for determining the current spatial disposition of the unmanned vehicle relative to the surrounding environment, such as an inertial measurement unit (IMU).

The performance of such sensing devices, however, may not be optimal in some instances. For example, IMUs and other inertial sensing devices may be susceptible to noise or measurement drift caused by vehicle vibrations. Existing strategies for vibration reduction and/or vibration isolation for IMUs and other inertial sensing devices, however, may have negative effects on the sensitivity, accuracy, and response time of these devices.

SUMMARY

A need exists for improved sensing devices for determining the spatial disposition of a movable object. Embodiments disclosed herein provide sensing devices including one or more accelerometers and one or more gyroscopes for detecting the acceleration and rotation of a movable object, respectively. The accelerometers and gyroscopes can be coupled to a support base via respective damping elements configured to provide a predetermined amount of motion damping. In some instances, the amount of motion damping needed for optimal accelerometer performance may be different from the amount needed for optimal gyroscope performance. Accordingly, the amount of motion damping applied to the accelerometers and the gyroscopes can be varied by adjusting the properties of the corresponding damping elements. Advantageously, this approach can be used to customize the damping parameters for each sensor type, thus reducing the incidence of noise and measurement drift while maintaining a satisfactory level of sensor sensitivity, accuracy, and responsiveness.

Thus, in one aspect, an apparatus for determining a spatial disposition of a movable object is provided. The apparatus comprises: a support base configured to be carried by a movable object; one or more accelerometers coupled to the support base via a first damping element configured to damp motion of the one or more accelerometers; and one or more gyroscopes coupled to the support base via a second damping element configured to damp motion of the one or more gyroscopes, wherein an amount of motion damping provided by the first damping element is greater than an amount of motion damping provided by the second damping element.

In some embodiments, the movable object can be an unmanned aerial vehicle (UAV). The one or more accelerometers can be microelectromechanical system (MEMS) accelerometers. The one or more accelerometers can be configured to detect an acceleration of the movable object with respect to up to three axes of motion. The three axes of motion can be orthogonal axes. The one or more gyroscopes can be microelectromechanical system (MEMS) gyroscopes. The one or more gyroscopes can be configured to detect a rotation of the movable object with respect to up to three axes of rotation. The three axes of rotation can be orthogonal axes.

In some embodiments, at least one of the first or second damping elements can comprise a sponge, a foam, or a rubber material. The first damping element can have a stiffness different from a stiffness of the second damping element. For instance, the stiffness of the first damping element can be less than the stiffness of the second damping element. The stiffness of the first damping element can be selected to reduce noise associated with a signal produced by the one or more accelerometers, and the stiffness of the second damping element can be selected to reduce noise associated with a signal produced by the one or more gyroscopes. The first damping element can be configured to damp vibrations of the one or more accelerometers, and the second damping element can be configured to damp vibrations of the one or more gyroscopes.

In another aspect, an unmanned aerial vehicle comprises: a vehicle body carrying an apparatus provided herein; and a processing unit configured to receive a signal indicative of an acceleration of the vehicle body from the one or more accelerometers, and a signal indicative of a rotation of the vehicle body from the one or more gyroscopes.

In another aspect, a method for determining a spatial disposition of a movable object comprises: providing an apparatus described herein; detecting an acceleration of the movable object using the one or more accelerometers; and detecting a rotation of the movable object using the one or more gyroscopes.

In another aspect, an apparatus for determining a spatial disposition of a movable object is provided. The apparatus comprises: a support base configured to be carried by a movable object; and a plurality of inertial measurement units each comprising at least one accelerometer and at least one gyroscope; and a plurality of damping elements each coupling at least one of the plurality of inertial measurement units to the support base so as to damp motion of the at least one of the plurality of inertial measurement units. In some embodiments, at least some of the plurality of damping elements can provide different amounts of motion damping.

In some embodiments, the movable object can be an unmanned aerial vehicle (UAV). At least one of the plurality of inertial measurement units can comprise a microelectromechanical system (MEMS) accelerometer. At least one of the plurality of inertial measurement units can comprise a microelectromechanical system (MEMS) gyroscope.

In some embodiments, at least one of the plurality of damping elements can comprise a sponge, a foam, or a rubber material. At least one of the plurality of damping elements can be coupled to more than one of the plurality of inertial measurement units. At least one of the plurality of damping elements can be configured to damp vibration of a coupled inertial measurement unit. At least some of the plurality of damping elements can have differing stiffnesses. At least one of the plurality of damping elements can have a stiffness selected to reduce noise associated with a signal produced by the at least one accelerometer and/or the at least gyroscope of a coupled inertial measurement unit.

In some embodiments, the apparatus further comprises a processing unit configured to receive a signal indicative an acceleration and/or rotation of the movable object from each of the plurality of inertial measurement units, and process the received signals to determine the acceleration and/or rotation of the movable object. The processing unit can process the received signals using a redundancy method or by averaging the received signals.

In some embodiments, the plurality of inertial measurement units can include a first inertial measurement unit and a second inertial measurement unit. The received signals can include a first signal received from the at least one accelerometer of the first inertial measurement unit, and a second signal received from the at least one gyroscope of the second inertial measurement unit. The first signal can be indicative of the acceleration of the movable object with respect to up to three axes of motion and the second signal can be indicative of the rotation of the movable object with respect to up to three axes of rotation. The plurality of damping elements can include a first damping element and a second damping element. The first inertial measurement unit can be coupled to the support base via the first damping element and the second inertial measurement unit can be coupled to the support base via the second damping element. The first damping element can provide a greater amount of motion damping than the second damping element. Optionally, a stiffness of the first damping element can be less than a stiffness of the second damping element.

In another aspect, an unmanned aerial vehicle comprises: a vehicle body carrying an apparatus provided herein; and a processing unit configured to receive a signal indicative an acceleration and/or rotation of the unmanned aerial vehicle from each of the plurality of inertial measurement units, and process the received signals to determine the acceleration and/or rotation of the unmanned aerial vehicle.

In another aspect, a method for determining a spatial disposition of a movable object comprises: providing an apparatus described herein; detecting an acceleration and/or rotation of the movable object using the plurality of inertial measurement units.

In another aspect, an apparatus for determining a spatial disposition of a movable object is provided. The apparatus comprises: a support base configured to be carried by a movable object; one or more accelerometers coupled to the support base via a first damping element configured to damp motion of the one or more accelerometers; and one or more gyroscopes directly coupled to the support base.

In some embodiments, the movable object can be an unmanned aerial vehicle (UAV). The one or more accelerometers can be microelectromechanical system (MEMS) accelerometers. The one or more accelerometers can be configured to detect an acceleration of the movable object with respect to up to three axes of motion. The three axes of motion can be orthogonal axes. The one or more gyroscopes can be microelectromechanical system (MEMS) gyroscopes. The one or more gyroscopes can be configured to detect a rotation of the movable object with respect to up to three axes of rotation. The three axes of rotation can be orthogonal axes.

In some embodiments, the damping element comprises a sponge, a foam, or a rubber material. The damping element can have a stiffness selected to reduce noise associated with a signal produced by the one or more accelerometers. The damping element can configured to damp vibrations of the one or more accelerometers.

In another aspect, an unmanned aerial vehicle comprises: a vehicle body carrying an apparatus provided herein; and a processing unit configured to receive a signal indicative of an acceleration of the vehicle body from the one or more accelerometers, and a signal indicative of a rotation of the vehicle body from the one or more gyroscopes.

In another aspect, a method for determining a spatial disposition of a movable object comprises: providing an apparatus described herein; detecting an acceleration of the movable object using the one or more accelerometers; and detecting a rotation of the movable object using the one or more gyroscopes.

It shall be understood that different aspects of the invention can be appreciated individually, collectively, or in combination with each other. Various aspects of the invention described herein may be applied to any of the particular applications set forth below or for any other types of movable objects. Any description herein of an aerial vehicle may apply to and be used for any movable object, such as any vehicle. Additionally, the systems, devices, and methods disclosed herein in the context of aerial motion (e.g., flight) may also be applied in the context of other types of motion, such as movement on the ground or on water, underwater motion, or motion in space. Furthermore, any description herein of a rotor or rotor assembly may apply to and be used for any propulsion system, device, or mechanism configured to generate a propulsive force by rotation (e.g., propellers, wheels, axles).

Other objects and features of the present invention will become apparent by a review of the specification, claims, and appended figures.

INCORPORATION BY REFERENCE

All publications, patents, and patent applications mentioned in this specification are herein incorporated by reference to the same extent as if each individual publication, patent, or patent application was specifically and individually indicated to be incorporated by reference.

BRIEF DESCRIPTION OF THE DRAWINGS

The novel features of the invention are set forth with particularity in the appended claims. A better understanding of the features and advantages of the present invention will be obtained by reference to the following detailed description that sets forth illustrative embodiments, in which the principles of the invention are utilized, and the accompanying drawings of which:

DETAILED DESCRIPTION

Figure 1:
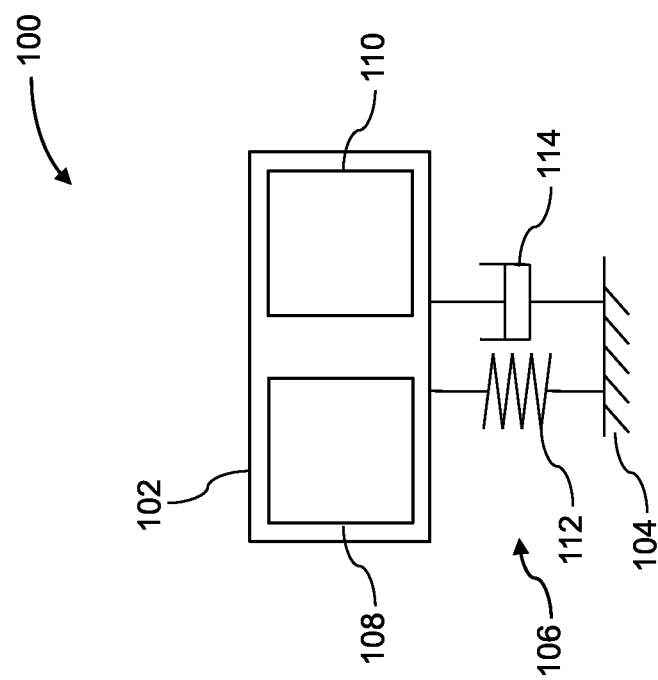
FIG. 1 illustrates a sensing device with damping, in accordance with embodiments.

The present disclosure provides improved sensing devices for determining a spatial disposition of a movable object such as an unmanned aerial vehicle (UAV). In some instances, the sensing devices described herein can include one or more inertial sensors. The term "inertial sensor" may be used herein to refer a motion sensor (e.g., a velocity sensor, an acceleration sensor such as an accelerometer), an orientation sensor (e.g., a gyroscope), or an inertial measurement unit (IMU) having one or more integrated motion sensors and/or one or more integrated orientation sensors. The inertial sensors can be coupled to a support base carried by the movable object via respective damping elements. The amount of motion damping provided by the damping elements may be optimized based on the inertial sensor type. For example, a damping element for an accelerometer may provide a different amount of damping than a damping element for a gyroscope. Contrary to existing sensing devices, in which different types of inertial sensors may be integrated into a single unit (e.g., an IMU) and thus receive the same amount of damping, the approaches described herein enable the amount of damping to be customized for different sensor types. This may be advantageous in situations where different amounts of damping are needed to achieve optimal performance for different sensor types. For example, higher damping may improve the signal-to-noise ratio for an accelerometer, but may also increase the response delay for a gyroscope. Consequently, the sensing devices described herein can be used in conjunction with control systems for a movable object so as to improve stability, response time, and accuracy and precision of control of the movable object.

Embodiments of the sensing devices described herein can be carried by a movable object, such as the movable objects provided below. A sensing device can be situated on any suitable portion of the movable object, such as above, underneath, on the side(s) of, or within a vehicle body of the movable object. In some instances, the sensing device is mechanically coupled to the movable object such that the spatial disposition and/or motion of the movable object correspond to the spatial disposition and/or motion sensed by the sensing device. The sensing device can be coupled to the movable object via a rigid coupling, such that the sensing device does not move relative to the portion of the movable object to which it is attached. Alternatively, the coupling between the sensing device and the movable object can permit movement of the sensing device relative to the movable object. The coupling can be a permanent coupling or non-permanent (e.g., releasable) coupling. Suitable coupling methods can include adhesives, bonding, welding, and/or fasteners (e.g., screws, nails, pins, etc.). Optionally, the sensing device can be integrally formed with a portion of the movable object. Furthermore, the sensing device can be electrically coupled with a portion of the movable object (e.g., processing unit, control system, data storage) so as to enable the sensing data collected by the sensing device to be used for various functions of the movable object (e.g., navigation, control, propulsion, communication with a user or other device, etc.).

The sensing device can include one or more sensors used to determine a current state of the movable object. Exemplary sensors suitable for incorporation with the embodiments described herein can include location sensors (e.g., global positioning system (GPS) sensors, mobile device transmitters enabling location triangulation), vision sensors (e.g., imaging devices capable of detecting visible, infrared, or UV light, such as cameras), proximity sensors (e.g., ultrasonic sensors, lidar), inertial sensors (e.g., accelerometers, gyroscopes, IMUs as described above), or field sensors (e.g., magnetometers, electromagnetic sensors). Any embodiment herein described with respect to inertial sensors can be applied to other types of sensors, and vice-versa. The state information provided by a sensor can include information regarding a spatial disposition of the movable object (e.g., position, orientation). The state information can also include information regarding motion of the movable object (e.g., translational velocity, translation acceleration, angular velocity, angular acceleration, etc.). A sensor can be configured, for instance, to determine a spatial disposition and/or motion of the movable object with respect to up to six degrees of freedom (e.g., three degrees of freedom in position and/or translation, three degrees of freedom in orientation and/or rotation). The state information may be provided relative to a global reference frame or relative to the reference frame of another entity. A processing unit can be utilized to receive and process the state information generated by one or more sensors so as to determine the spatial disposition and/or motion of the movable object. The spatial disposition and/or motion information can subsequently used for various applications, such as navigation, control, propulsion, communication, and so on.

For example, a sensing device can include any suitable number and combination of inertial sensors, such as at least one, two, three, or more accelerometers, and/or at least one, two, three, or more gyroscopes. Optionally, a sensing device can include at least one, two, three, or more IMUs, which may each include any number or combination of integrated accelerometers and gyroscopes. An inertial sensor may provide sensing data relative to a single axis of motion. The axis of motion may correspond to an axis of the inertial sensor (e.g., a longitudinal axis). In embodiments where the device includes a plurality of inertial sensors, each inertial sensor may provide measurements along a different axis of motion. For example, a sensing device may include three accelerometers so as to provide acceleration data along three different axes of motion. The three directions of motion may be orthogonal axes. One or more of the accelerometers may be linear accelerometers configured to measure acceleration along a translational axis. Conversely, one or more of the accelerometers may be angular accelerometers configured to measure acceleration about a rotational axis. As another example, a sensing device may include three gyroscopes so as to provide orientation data about three different axes of rotation. The three axes of rotation may be orthogonal axes (e.g., roll axis, pitch axis, yaw axis). Alternatively, at least some or all of the inertial sensors may provide measurement relative to the same axes of motion. Such redundancy may be implemented, for instance, to improve measurement accuracy. Optionally, an inertial sensor may be capable of providing sensing data relative to a plurality of axes. For example, an IMU including a plurality of integrated accelerometers and gyroscopes can be used to generate acceleration data and orientation data with respect to up to six axes of motion. Alternatively, a single accelerometer can be used to detect acceleration along multiple axes, and a single gyroscope can be used to detect rotation about multiple axes.

Various configurations and embodiments of inertial sensors can be incorporated in the sensing devices described herein. For example, the length or width of an inertial sensor may be less than or equal to approximately 20 microns, 50 microns, 100 microns, 200 microns, 500 microns, 1 mm, 2 mm, 3 mm, 4 mm, 5 mm, 6 mm, 7 mm, 8 mm, 9 mm, 10 mm, 15 mm, 20 mm, 30 mm, 40 mm, or 50 mm. Conversely, the length or width of an inertial sensor may be greater than or equal to approximately 20 microns, 50 microns, 100 microns, 200 microns, 500 microns, 1 mm, 2 mm, 3 mm, 4 mm, 5 mm, 6 mm, 7 mm, 8 mm, 9 mm, 10 mm, 15 mm, 20 mm, 30 mm, 40 mm, or 50 mm. Some or all of the inertial sensors described herein can be microelectromechanical system (MEMS) sensors, which may be smaller than other types of inertial sensors. Such MEMS sensors can be provided as part of an integrated circuit, such as within a chip.

The sensing device can include components suitable for supporting the sensors, such as a support base. The support base can include a housing, board, wall, platform, frame, or any other element suitable for mounting and securing the sensors. The support base may be approximately flat or planar. Conversely, the support base may be shaped as a cube, prism, cylinder, sphere, hemisphere, or any other suitable three-dimensional geometric shape. The support base can be hollow or solid. Additionally, the support base can be formed as a single element or a plurality of discrete elements. In the latter embodiment, the various discrete elements of the support base can be situated on different portions of the movable object. In some instances, the support base can be coupled to or integrally formed with a vehicle housing or vehicle body for the movable object. The support base can be rigidly connected to the movable object, such that the motion of the support base corresponds to the motion of the movable object. Alternatively, the support base may be permitted to move relative to the movable object. The material properties of the support base may be varied as desired. For example, the support base may be formed from a relatively rigid material. Alternatively, the support base may be formed from a relatively compliant material. Optionally, the support base can include electrical coupling elements (e.g., wires, circuitry) suitable for electrically connecting the sensors to another component as previously described herein, or can be configured to accommodate such electrical coupling elements.

The sensors described herein can be coupled to the support base in any suitable arrangement. For example, one or more of the sensors can be coupled to an upper surface, bottom surface, lateral surface, exterior surface, and/or interior surface of the support base. Different sensors may be coupled to different portions of the support base. In some instances, a plurality of sensors may each be coupled to the support base in an arrangement maintaining a predetermined spatial relationship between the sensors. For example, the plurality of sensors may each be coupled to a respective orthogonal wall of a support base, such that the sensors are oriented orthogonally to each other. Alternatively, at least some of the plurality of sensors can be arranged parallel to each other. The sensors can be coupled to the support base using any suitable coupling mechanism, such as the coupling mechanisms previously described herein. The sensors can be coupled directly to the support base, or indirectly via one or more intermediary elements. The sensors may or may not directly contact the support base when coupled.

In some instances, the sensors can be coupled indirectly to the support base via a damping element. The damping element can be any element suitable for damping motion of the coupled sensor, such as an active damping element, a passive damping element, or a hybrid damping element having both active and passive damping characteristics. The motion damped by the damping elements provided herein can include one or more of vibrations, oscillations, shaking, or impacts. Such motions may originate from motions of the movable object that are transmitted to the sensor via the support base. The damping element may provide motion damping by isolating the sensor from the source of unwanted motion by dissipating or reducing the amount of motion transmitted to sensor (e.g., vibration isolation). The damping element may reduce the magnitude (e.g., amplitude) of the motion that would otherwise be experienced by the sensor, such as by greater than or equal to approximately 10%, 20%, 30%, 40%, 50%, 60%, 70%, 80%, 90%, or 100%. In some instances, the damping element can be configured to reduce motions having certain frequencies. For example, some damping elements can reduce high frequency motions, while other damping elements can reduce low frequency motions. A damping element can damp motions having frequencies greater than or equal to about 0.5 Hz, 1 Hz, 5 Hz, 10 Hz, 20 Hz, 30 Hz, 40 Hz, 50 Hz, 100 Hz, 200 Hz, 300 Hz, 400 Hz, 500 Hz, 600 Hz, 700 Hz, 800 Hz, 900 Hz, or 1000 Hz. Alternatively, a damping element can damp motions having frequencies less than or equal to about 0.5 Hz, 1 Hz, 5 Hz, 10 Hz, 20 Hz, 30 Hz, 40 Hz, 50 Hz, 100 Hz, 200 Hz, 300 Hz, 400 Hz, 500 Hz, 600 Hz, 700 Hz, 800 Hz, 900 Hz, or 1000 Hz. The motion damping applied by the damping element may improve the quality of sensor signals produced by the sensor, such as by reducing the amount of noise and/or measurement drift of the sensor, as well as by increasing the accuracy, precision, responsiveness, and/or stability of the sensor.

The damping elements described herein can be formed from any suitable material or combination of materials, including solid, liquid, or gaseous materials. The materials used for the damping elements may be compressible and/or deformable. For example, the damping element can be a sponge, foam, rubber material, gel, and the like. Alternatively or in addition, the damping element can include piezoelectric materials or shape memory materials. The damping element can include one or more mechanical elements, such as springs, pistons, hydraulics, pneumatics, dashpots, shock absorbers, isolators, and the like. The properties of the damping element can be selected so as to provide a predetermined amount of motion damping. For example, the damping element may have a characteristic stiffness, which may correspond to a Young's modulus of the damping element. The Young's modulus may be greater than or equal to approximately 0.01 GPa, 0.05 GPa, 0.1 GPa, 0.2 GPa, 0.3 GPa, 0.4 GPa, 0.5 GPa, 0.6 GPa, 0.7 GPa, 0.8 GPa, 0.9 GPa, 1 GPa, or 5 GPa. Alternatively, the Young's modulus may be less than or equal to approximately 0.01 GPa, 0.05 GPa, 0.1 GPa, 0.2 GPa, 0.3 GPa, 0.4 GPa, 0.5 GPa, 0.6 GPa, 0.7 GPa, 0.8 GPa, 0.9 GPa, 1 GPa, or 5 GPa. In some instances, the damping element may have viscoelastic properties. The properties of the damping element may be isotropic or anisotropic. For instance, the damping element may provide motion damping equally along all directions of motion. Conversely, the damping element may provide motion damping only along a subset of the directions of motion (e.g., along a single direction of motion).

The couplings between the sensor and damping element and between the damping element and the support base can use any suitable coupling mechanism, such as those previously described herein. Furthermore, although embodiments herein may be depicted as utilizing a single damping element coupled to a single sensor, it shall be understood that any suitable combination of damping elements and sensors can be used. For example, a single sensor can be coupled to the support base using a plurality of damping elements. Each damping element can be coupled to a different portion of the sensor (e.g., an upper surface, lower surface, lateral surface, interior surface, and/or exterior surface). In some instances, the sensor can be embedded within or enclosed by a damping element. Alternatively, the damping element can be coupled only to certain portions of the sensor (e.g., only to a single surface of the sensor).

Turning now to the drawings, FIG. 1 illustrates a sensing device 100 with damping, in accordance with embodiments. The sensing device 100 can include at least one inertial sensor 102 coupled to a support base 104 via a damping element 106. In some instances, the inertial sensor 102 can be an IMU having any suitable combination of accelerometers and gyroscopes, such as one or more accelerometers 108 and one or more gyroscopes 110. The accelerometers 108 and gyroscopes 110 can be integrated into the IMU such that the inertial sensor 102 is provided as a single component (e.g., a single chip). The sensing device 100 can include a processing unit (not shown) coupled to the inertial sensor 102 so as to receive and process sensor signals from the one or more accelerometers 108 and one or more gyroscopes 110, and thereby determine the acceleration and rotation of the sensing device 100.

The damping element 106, represented herein as a spring 112 and damper 114, can provide motion damping to the inertial sensor 102. The spring 112 can be characterized by a spring coefficient representative of the elastic properties of the damping element 106, and the damper 114 can be characterized by a damping coefficient representative of the viscous properties of the damping element 106. Although FIG. 1 depicts a single spring 112 and damper 114 in parallel, the damping element 106, as with all other damping elements provided herein, can be represented by any number, combination, and arrangement of springs, dampers, or other representative components, each characterized by respective coefficients corresponding to the properties (e.g., stiffness, viscoelasticity) of the damping element 106. In some instances, the damping element 106 can be represented by a single component (e.g., a single spring, a single damper) rather than multiple components. The amount of motion damping provided by the damping element 106 can be determined based on the properties of the damping element 106. In embodiments where the accelerometers 108 and gyroscopes 110 are integrated into the inertial sensor 102 so as to form a single component, the motion damping provided by the damping element 106 may be applied uniformly to the accelerometers 108 and gyroscopes 110, such that the accelerometers 108 and gyroscopes 110 receive the same or similar amounts of motion damping.

Figure 2:
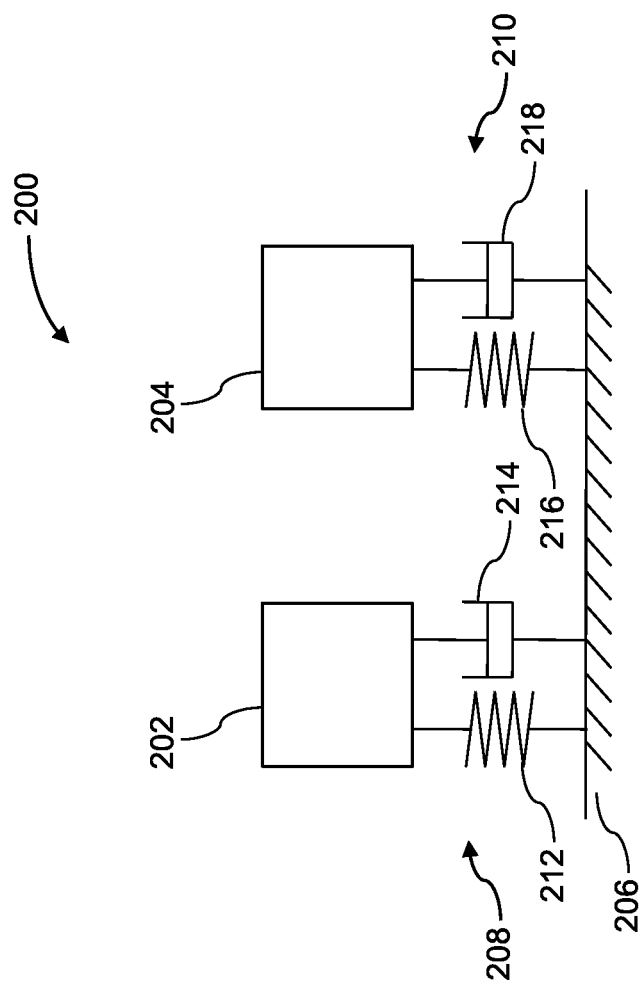
FIG. 2 illustrates a sensing device with separately damped sensors, in accordance with embodiments.

FIG. 2 illustrates a sensing device 200 with separately damped sensors, in accordance with embodiments. The sensing device 200 can include a plurality of sensors, such as a first inertial sensor 202 and a second inertial sensor 204. The plurality of sensors can be coupled to a support base 206 via a plurality of damping elements. For example, the first and second inertial sensors 202, 204 can be coupled to the support base 206 via respective first and second damping elements 208, 210. The sensors of the sensing device 200 can each be coupled to the support base 206 via a different damping element. Alternatively, at least some of the sensors can be coupled to the support base 206 via the same damping element. In some instances, the plurality of sensors, including the first and second inertial sensors 202, 204, can be coupled to a processing unit (not shown) configured to receive and process signals generated by the sensors to determine the spatial disposition and/or motion of the sensing device 200 (e.g., acceleration and/or rotation).

The first and second damping elements 208, 210 can have any suitable material characteristics. For instance, the first damping element 208 can be represented by a first spring 212 characterized by a first spring coefficient and a first damper 214 characterized by a first damping coefficient. The second damping element 210 can be represented by a second spring 216 characterized by a second spring coefficient and a second damper 218 characterized by a second damping coefficient. The first spring coefficient and first damping coefficient may be representative of the properties of the first damping element 208, and the second spring coefficient and second damping coefficient may be representative of the properties of the second damping element 210.

In some instances, the first inertial sensor 202 is of a different sensor type than the second inertial sensor 204. For example, the first inertial sensor 202 can include one or more accelerometers and the second inertial sensor 204 can include one or more gyroscopes, or vice-versa. The properties of the first damping element 208 (e.g., stiffness, viscoelasticity) may be different from the properties of the second damping element 210. For example, the first damping element 208 can be less stiff than the second damping element 210, or vice-versa. Accordingly, the amount of motion damping applied to the first inertial sensor 202 can be different than (e.g., greater than, less than) the amount applied to the second inertial sensor 204. For example, the motion damping applied to the first inertial sensor 202 may be approximately 10%, 20%, 30%, 40%, 50%, 60%, 70%, 80%, or 90% of the motion damping applied to the second inertial sensor 204, or vice-versa. Conversely, the amount of motion damping applied to the first inertial sensor 202 may be approximately 110%, 120%, 130%, 140%, 150%, 160%, 170%, 180%, 190%, 200%, 300%, 400%, or 500% of the motion damping applied to the second inertial sensor 204, or vice-versa.

In some instances, the amount of motion damping applied to the first and second inertial sensors 202, 204 by the first and second damping elements 208, 210, respectively, may be selected based on the amount of damping needed to optimize or improve the performance of the first and second inertial sensors 202, 204 (e.g., with respect to reducing noise and/or accuracy while maintaining satisfactory accuracy, precision, responsiveness, and/or stability). For example, as previously discussed above, a larger amount of motion damping may be beneficial for an accelerometer, while a smaller amount of motion damping may be beneficial for a gyroscope. Since the inertial sensors 202, 204 are provided as separate components rather than integrated into a single component, the amount of damping can be varied individually for each sensor. Accordingly, the properties (e.g., stiffness) of the damping elements 208, 210 can be selected so as to provide the appropriate amount of motion damping, depending on the sensor type of the coupled inertial sensor. For instance, the first inertial sensor 202 can be an accelerometer and the second inertial sensor 204 can be a gyroscope. The damping provided by the first damping element 208 for the first inertial sensor 202 can be greater than the damping provided by the second damping element 210 for the second inertial sensor 204.

Figure 3:
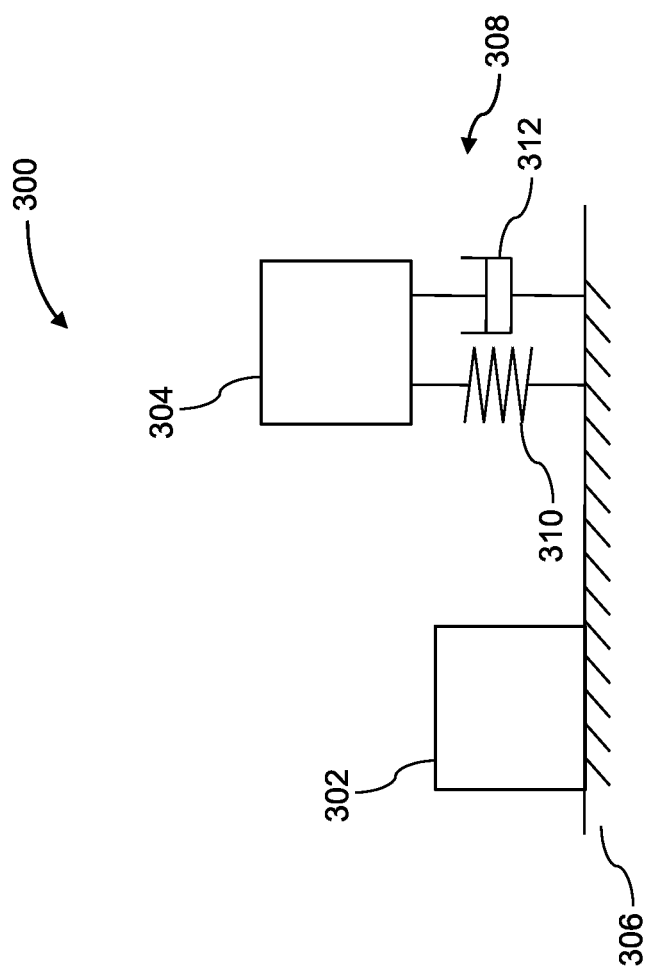
FIG. 3 illustrates a sensing device with damped and undamped sensors, in accordance with embodiments.

FIG. 3 illustrates a sensing device 300 with damped and undamped sensors, in accordance with embodiments. The sensing device 300 can include a plurality of sensors, such as a first inertial sensor 302 and a second inertial sensor 304. The first inertial sensor 302 can be coupled to a support base 306 without any intervening elements that provide motion damping. In some instances, the first inertial sensor 302 can be coupled directly to the support base 306. The second inertial sensor 304 can be coupled to the support base 306 via a damping element 308, represented herein by a spring 310 characterized by a spring coefficient and a damper 312 characterized by a damping coefficient. The first inertial sensor 302 can be of a sensor type that does not require motion damping to generate sensing data of optimal or satisfactory quality. For example, the first inertial sensor 302 can include one or more gyroscopes. Conversely, the second inertial sensor 304 can be of a sensor type that exhibits improved performance when motion damping is applied. For example, the second inertial sensor 304 can include one or more accelerometers. The properties of the damping element 308 can be selected so as to provide an appropriate amount of motion damping for the second inertial sensor 304, similar to the other embodiments previously described herein. Similar to the other embodiments provided herein, the first and second inertial sensors 302, 304 can be coupled to a processing unit configured to process sensing signals received from the first and second inertial sensors 302, 304.

Figure 4:
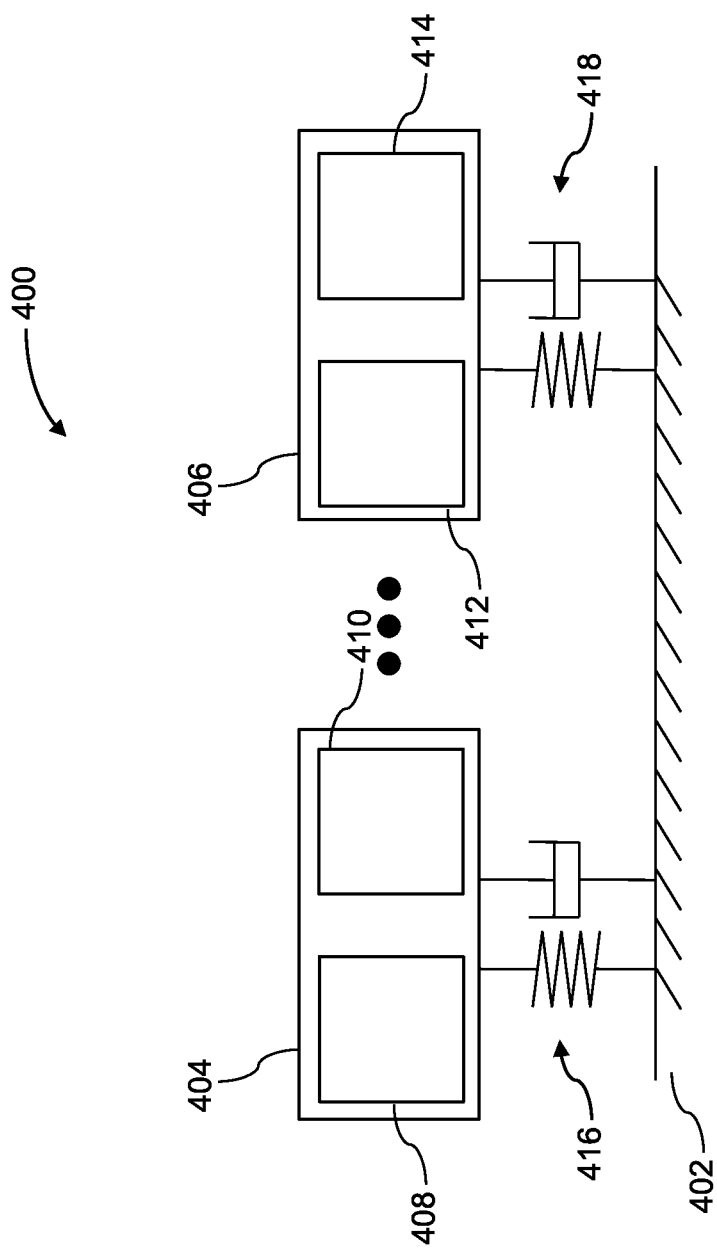
FIG. 4 illustrates a sensing device with separately damped sensors, in accordance with embodiments.

FIG. 4 illustrates a sensing device 400 with separately damped sensors, in accordance with embodiments. The sensing device 400 can include a plurality of inertial sensors coupled to a support base 402, including at least a first inertial sensor 404 and a second inertial sensor 406. Although only two inertial sensors 404, 406 are depicted herein, it shall be understood that the sensing device 400, as with any of the sensing devices described herein, can include any suitable number of inertial sensors. The first inertial sensor 404 can be an IMU including one or more integrated accelerometers 408 and one or more integrated gyroscopes 410. Similarly, the second inertial sensor 406 can be an IMU including one or more integrated accelerometers 412 and one or more integrated gyroscopes 414.

The plurality of inertial sensors of the sensing device 400 can be coupled to the support base 402 via a plurality of damping elements. For example, the first and second inertial sensors 404, 406 can be respectively coupled to the support base 402 via first and second damping elements 416, 418. The first and second damping elements 416, 418 can each be represented by a suitable combination of springs and dampers as previously discussed. In some instances, one or more of the plurality of inertial sensors can be coupled to the support base 402 by more than one damping element (e.g., by two, three, four, five, or more damping elements). Conversely, one or more of the inertial sensors can be coupled to the support base 402 directly, without any damping elements. Optionally, some of the sensors of the sensing device 400 can be coupled to the support base 402 by the same damping element.

Similar to the embodiments of the sensing device 200, the properties of the various damping elements may differ from each other. For example, the properties of the first damping element 416 may be different from the properties of the second damping element 418. In some instances, the first damping element 416 can be less stiff than the second damping element 418, or vice-versa. Accordingly, the amount of motion damping applied to the first inertial sensor 404 can be different than (e.g., greater than, less than) the amount applied to the second inertial sensor 406. For example, the motion damping applied to the first inertial sensor 404 may be approximately 0%, 10%, 20%, 30%, 40%, 50%, 60%, 70%, 80%, or 90% of the motion damping applied to the second inertial sensor 406, or vice-versa. Conversely, the amount of motion damping applied to the first inertial sensor 404 may be approximately 110%, 120%, 130%, 140%, 150%, 160%, 170%, 180%, 190%, 200%, 300%, 400%, or 500% of the motion damping applied to the second inertial sensor 406, or vice-versa.

In some instances, the amount of motion damping applied to the first and second inertial sensors 404, 406 by the first and second damping elements 416, 418, respectively, may be selected based on the amount of damping needed to optimize or improve the performance of a sensor type of the first and second inertial sensors 404, 406. For example, the damping amount applied by the first damping element 416 can be selected based on the damping requirements of the accelerometers 408 of the first inertial sensor 404, and the damping amount applied by the second damping element 418 can be selected based on the damping requirements of the gyroscopes 414 of the second inertial sensor 406. In such embodiments, the first damping element 416 may be less stiff than the second damping element 418, so as to provide a greater amount of motion damping than the second damping element 418.

As previously mentioned, some of the sensors of the sensing device 400 can be coupled to the support base 402 by the same damping element. According, one or more damping elements of the sensing device 400 may be coupled to more than one inertial sensor. The shared damping element(s) may provide the same or a similar amount of motion damping to the coupled sensors. This approach may be beneficial for sensors having similar damping requirements.

The sensing device 400 can be coupled to a processing unit (not shown) configured to receive sensing signals from each of the plurality of sensors, including the first and second inertial sensors 404, 406. Optionally, some of the sensing signals received by the processing unit may be redundant with other sensing signals. For example, the processing unit may receive more than one signal indicative of acceleration, more than one signal indicative of rotation, and so on. The processing unit can process the received signals in any suitable manner so as to determine the spatial disposition and/or motion. For example, the processing unit can average some or all of the received sensor signals. Alternatively, the processing unit can process some or all of the received signals using a redundancy method. A redundancy method for received signals that are continuous values may include determining one or more intermediate values between the received signal values (e.g., an average of the received signal values), and outputting the intermediate value(s) as the processing result. A redundancy method for received signals that are discrete values may include determining a value that is nearest to or equal to the majority of the received signal values, and outputting that value as the processing result.

In some instances, the processing unit may receive signals from only the sensor type of the first and second inertial sensors 404, 406 for which the motion damping was optimized or improved (referred to herein as "optimized sensors"). For example, the processing unit may receive acceleration signals from only the accelerometers 408 of the first inertial sensor 404 and rotation signals from only the gyroscopes 414 of the second inertial sensor 406. Alternatively, the processing unit may receive sensor signals from all of the sensor types of both the first and second inertial sensors 404, 406, but may only utilize the signals from the optimized sensors when determining the spatial disposition of the movable object. Conversely, the processing unit may utilize all of the signals from all of the sensor types to determine the spatial disposition, but may assign a greater weight to the signals from the optimized sensors (e.g., a weighted average). Advantageously, this approach may enable the benefits of customizable damping to be applied to inertial sensors including both integrated accelerometers and integrated gyroscopes (e.g., IMUs).

The systems, devices, and methods described herein can be applied to a wide variety of movable objects. As previously mentioned, any description herein of an aerial vehicle may apply to and be used for any movable object. A movable object of the present invention can be configured to move within any suitable environment, such as in air (e.g., a fixed-wing aircraft, a rotary-wing aircraft, or an aircraft having neither fixed wings nor rotary wings), in water (e.g., a ship or a submarine), on ground (e.g., a motor vehicle, such as a car, truck, bus, van, motorcycle; a movable structure or frame such as a stick, fishing pole; or a train), under the ground (e.g., a subway), in space (e.g., a spaceplane, a satellite, or a probe), or any combination of these environments. The movable object can be a vehicle, such as a vehicle described elsewhere herein. In some embodiments, the movable object can be mounted on a living subject, such as a human or an animal. Suitable animals can include avines, canines, felines, equines, bovines, ovines, porcines, delphines, rodents, or insects.

The movable object may be capable of moving freely within the environment with respect to six degrees of freedom (e.g., three degrees of freedom in translation and three degrees of freedom in rotation). Alternatively, the movement of the movable object can be constrained with respect to one or more degrees of freedom, such as by a predetermined path, track, or orientation. The movement can be actuated by any suitable actuation mechanism, such as an engine or a motor. The actuation mechanism of the movable object can be powered by any suitable energy source, such as electrical energy, magnetic energy, solar energy, wind energy, gravitational energy, chemical energy, nuclear energy, or any suitable combination thereof. The movable object may be self-propelled via a propulsion system, as described elsewhere herein. The propulsion system may optionally run on an energy source, such as electrical energy, magnetic energy, solar energy, wind energy, gravitational energy, chemical energy, nuclear energy, or any suitable combination thereof. Alternatively, the movable object may be carried by a living being.

In some instances, the movable object can be a vehicle. Suitable vehicles may include water vehicles, aerial vehicles, space vehicles, or ground vehicles. For example, aerial vehicles may be fixed-wing aircraft (e.g., airplane, gliders), rotary-wing aircraft (e.g., helicopters, rotorcraft), aircraft having both fixed wings and rotary wings, or aircraft having neither (e.g., blimps, hot air balloons). A vehicle can be self-propelled, such as self-propelled through the air, on or in water, in space, or on or under the ground. A self-propelled vehicle can utilize a propulsion system, such as a propulsion system including one or more engines, motors, wheels, axles, magnets, rotors, propellers, blades, nozzles, or any suitable combination thereof. In some instances, the propulsion system can be used to enable the movable object to take off from a surface, land on a surface, maintain its current position and/or orientation (e.g., hover), change orientation, and/or change position.

The movable object can be controlled remotely by a user or controlled locally by an occupant within or on the movable object. In some embodiments, the movable object is an unmanned movable object, such as a UAV. An unmanned movable object, such as a UAV, may not have an occupant onboard the movable object. The movable object can be controlled by a human or an autonomous control system (e.g., a computer control system), or any suitable combination thereof. The movable object can be an autonomous or semi-autonomous robot, such as a robot configured with an artificial intelligence.

The movable object can have any suitable size and/or dimensions. In some embodiments, the movable object may be of a size and/or dimensions to have a human occupant within or on the vehicle. Alternatively, the movable object may be of size and/or dimensions smaller than that capable of having a human occupant within or on the vehicle. The movable object may be of a size and/or dimensions suitable for being lifted or carried by a human. Alternatively, the movable object may be larger than a size and/or dimensions suitable for being lifted or carried by a human. In some instances, the movable object may have a maximum dimension (e.g., length, width, height, diameter, diagonal) of less than or equal to about: 2 cm, 5 cm, 10 cm, 50 cm, 1 m, 2 m, 5 m, or 10 m. The maximum dimension may be greater than or equal to about: 2 cm, 5 cm, 10 cm, 50 cm, 1 m, 2 m, 5 m, or 10 m. For example, the distance between shafts of opposite rotors of the movable object may be less than or equal to about: 2 cm, 5 cm, 10 cm, 50 cm, 1 m, 2 m, 5 m, or 10 m. Alternatively, the distance between shafts of opposite rotors may be greater than or equal to about: 2 cm, 5 cm, 10 cm, 50 cm, 1 m, 2 m, 5 m, or 10 m.

In some embodiments, the movable object may have a volume of less than 100 cm×100 cm×100 cm, less than 50 cm×50 cm×30 cm, or less than 5 cm×5 cm×3 cm. The total volume of the movable object may be less than or equal to about: 1 $cm^3$, 2 $cm^3$, 5 $cm^3$, 10 $cm^3$, 20 $cm^3$, 30 $cm^3$, 40 $cm^3$, 50 $cm^3$, 60 $cm^3$, 70 $cm^3$, 80 $cm^3$, 90 $cm^3$, 100 $cm^3$, 150 $cm^3$, 200 $cm^3$, 300 $cm^3$, 500 $cm^3$, 750 $cm^3$, 1000 $cm^3$, 5000 $cm^3$, 10,000 $cm^3$, 100,000 $cm^3$, 1 $m^3$, or 10 $m^3$. Conversely, the total volume of the movable object may be greater than or equal to about: 1 $cm^3$, 2 $cm^3$, 5 $cm^3$, 10 $cm^3$, 20 $cm^3$, 30 $cm^3$, 40 $cm^3$, 50 $cm^3$, 60 $cm^3$, 70 $cm^3$, 80 $cm^3$, 90 $cm^3$, 100 $cm^3$, 150 $cm^3$, 200 $cm^3$, 300 $cm^3$, 500 $cm^3$, 750 $cm^3$, 1000 $cm^3$, 5000 $cm^3$, 10,000 $cm^3$, 100,000 $cm^3$, 1 $m^3$, or 10 $m^3$.

In some embodiments, the movable object may have a footprint (which may refer to the lateral cross-sectional area encompassed by the movable object) less than or equal to about: 32,000 $cm^2$, 20,000 $cm^2$, 10,000 $cm^2$, 1,000 $cm^2$, 500 $cm^2$, 100 $cm^2$, 50 $cm^2$, 10 $cm^2$, or 5 $cm^2$. Conversely, the footprint may be greater than or equal to about: 32,000 $cm^2$, 20,000 $cm^2$, 10,000 $cm^2$, 1,000 $cm^2$, 500 $cm^2$, 100 $cm^2$, 50 $cm^2$, 10 $cm^2$, or 5 $cm^2$.

In some instances, the movable object may weigh no more than 1000 kg. The weight of the movable object may be less than or equal to about: 1000 kg, 750 kg, 500 kg, 200 kg, 150 kg, 100 kg, 80 kg, 70 kg, 60 kg, 50 kg, 45 kg, 40 kg, 35 kg, 30 kg, 25 kg, 20 kg, 15 kg, 12 kg, 10 kg, 9 kg, 8 kg, 7 kg, 6 kg, 5 kg, 4 kg, 3 kg, 2 kg, 1 kg, 0.5 kg, 0.1 kg, 0.05 kg, or 0.01 kg. Conversely, the weight may be greater than or equal to about: 1000 kg, 750 kg, 500 kg, 200 kg, 150 kg, 100 kg, 80 kg, 70 kg, 60 kg, 50 kg, 45 kg, 40 kg, 35 kg, 30 kg, 25 kg, 20 kg, 15 kg, 12 kg, 10 kg, 9 kg, 8 kg, 7 kg, 6 kg, 5 kg, 4 kg, 3 kg, 2 kg, 1 kg, 0.5 kg, 0.1 kg, 0.05 kg, or 0.01 kg.

In some embodiments, a movable object may be small relative to a load carried by the movable object. The load may include a payload and/or a carrier, as described in further detail below. In some examples, a ratio of a movable object weight to a load weight may be greater than, less than, or equal to about 1:1. In some instances, a ratio of a movable object weight to a load weight may be greater than, less than, or equal to about 1:1. Optionally, a ratio of a carrier weight to a load weight may be greater than, less than, or equal to about 1:1. When desired, the ratio of an movable object weight to a load weight may be less than or equal to: 1:2, 1:3, 1:4, 1:5, 1:10, or even less. Conversely, the ratio of a movable object weight to a load weight can also be greater than or equal to: 2:1, 3:1, 4:1, 5:1, 10:1, or even greater.

In some embodiments, the movable object may have low energy consumption. For example, the movable object may use less than about: 5 W/h, 4 W/h, 3 W/h, 2 W/h, 1 W/h, or less. In some instances, a carrier of the movable object may have low energy consumption. For example, the carrier may use less than about: 5 W/h, 4 W/h, 3 W/h, 2 W/h, 1 W/h, or less. Optionally, a payload of the movable object may have low energy consumption, such as less than about: 5 W/h, 4 W/h, 3 W/h, 2 W/h, 1 W/h, or less.

Figure 5:
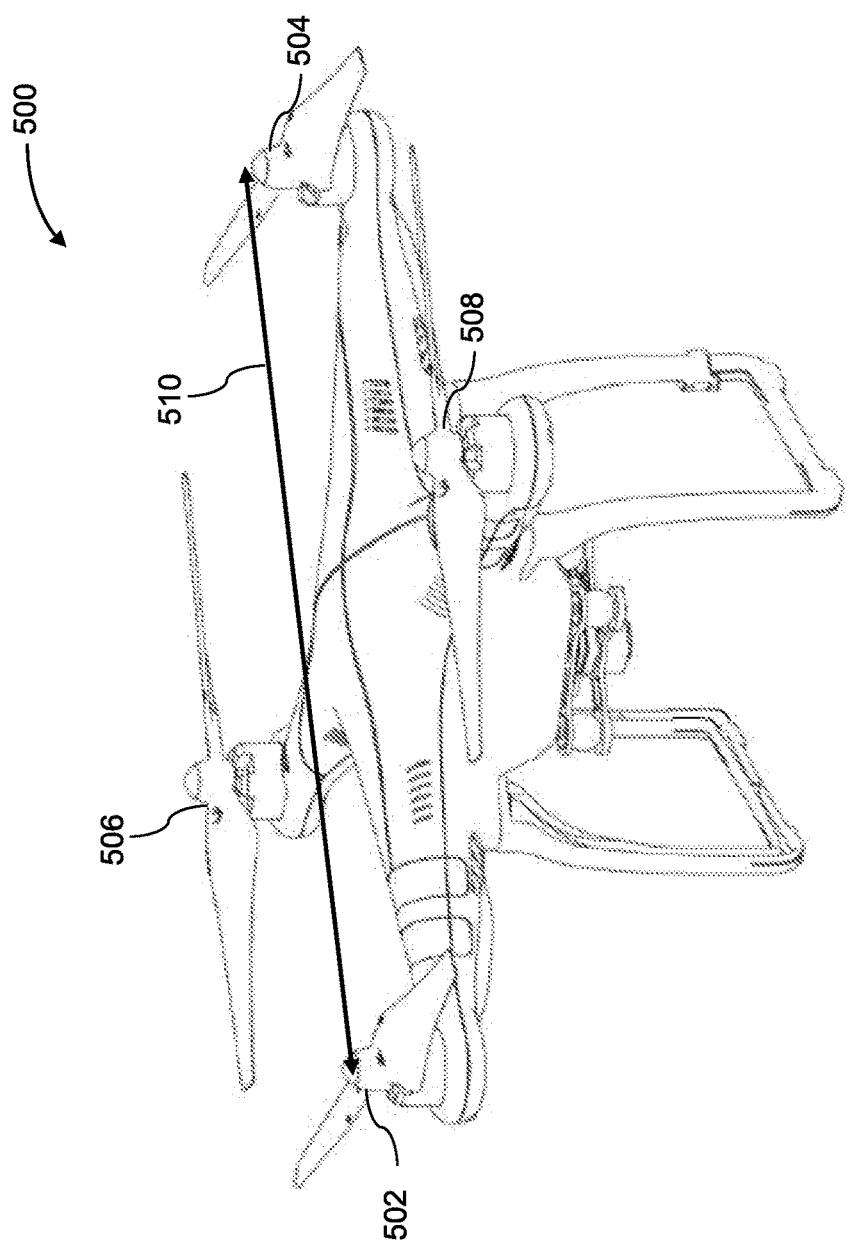
FIG. 5 illustrates an unmanned aerial vehicle, in accordance with embodiments.

FIG. 5 illustrates an unmanned aerial vehicle (UAV) 500, in accordance with embodiments of the present invention. The UAV may be an example of a movable object as described herein. The UAV 500 can include a propulsion system having four rotors 502, 504, 506, and 508. Any number of rotors may be provided (e.g., one, two, three, four, five, six, or more). The rotors can be embodiments of the self-tightening rotors described elsewhere herein. The rotors, rotor assemblies, or other propulsion systems of the unmanned aerial vehicle may enable the unmanned aerial vehicle to hover/maintain position, change orientation, and/or change location. The distance between shafts of opposite rotors can be any suitable length 510. For example, the length 510 can be less than or equal to 2 m, or less than equal to 5 m. In some embodiments, the length 510 can be within a range from 40 cm to 1 m, from 10 cm to 2 m, or from 5 cm to 5 m. Any description herein of a UAV may apply to a movable object, such as a movable object of a different type, and vice versa.

In some embodiments, the movable object can be configured to carry a load. The load can include one or more of passengers, cargo, equipment, instruments, and the like. The load can be provided within a housing. The housing may be separate from a housing of the movable object, or be part of a housing for an movable object. Alternatively, the load can be provided with a housing while the movable object does not have a housing. Alternatively, portions of the load or the entire load can be provided without a housing. The load can be rigidly fixed relative to the movable object. Optionally, the load can be movable relative to the movable object (e.g., translatable or rotatable relative to the movable object).

In some embodiments, the load includes a payload. The payload can be configured not to perform any operation or function. Alternatively, the payload can be a payload configured to perform an operation or function, also known as a functional payload. For example, the payload can include one or more sensors for surveying one or more targets. Any suitable sensor can be incorporated into the payload, such as an image capture device (e.g., a camera), an audio capture device (e.g., a parabolic microphone), an infrared imaging device, or an ultraviolet imaging device. The sensor can provide static sensing data (e.g., a photograph) or dynamic sensing data (e.g., a video). In some embodiments, the sensor provides sensing data for the target of the payload. Alternatively or in combination, the payload can include one or more emitters for providing signals to one or more targets. Any suitable emitter can be used, such as an illumination source or a sound source. In some embodiments, the payload includes one or more transceivers, such as for communication with a module remote from the movable object. Optionally, the payload can be configured to interact with the environment or a target. For example, the payload can include a tool, instrument, or mechanism capable of manipulating objects, such as a robotic arm.

Optionally, the load may include a carrier. The carrier can be provided for the payload and the payload can be coupled to the movable object via the carrier, either directly (e.g., directly contacting the movable object) or indirectly (e.g., not contacting the movable object). Conversely, the payload can be mounted on the movable object without requiring a carrier. The payload can be integrally formed with the carrier. Alternatively, the payload can be releasably coupled to the carrier. In some embodiments, the payload can include one or more payload elements, and one or more of the payload elements can be movable relative to the movable object and/or the carrier, as described above.

The carrier can be integrally formed with the movable object. Alternatively, the carrier can be releasably coupled to the movable object. The carrier can be coupled to the movable object directly or indirectly. The carrier can provide support to the payload (e.g., carry at least part of the weight of the payload). The carrier can include a suitable mounting structure (e.g., a gimbal platform) capable of stabilizing and/or directing the movement of the payload. In some embodiments, the carrier can be adapted to control the state of the payload (e.g., position and/or orientation) relative to the movable object. For example, the carrier can be configured to move relative to the movable object (e.g., with respect to one, two, or three degrees of translation and/or one, two, or three degrees of rotation) such that the payload maintains its position and/or orientation relative to a suitable reference frame regardless of the movement of the movable object. The reference frame can be a fixed reference frame (e.g., the surrounding environment). Alternatively, the reference frame can be a moving reference frame (e.g., the movable object, a payload target).

In some embodiments, the carrier can be configured to permit movement of the payload relative to the carrier and/or movable object. The movement can be a translation with respect to up to three degrees of freedom (e.g., along one, two, or three axes) or a rotation with respect to up to three degrees of freedom (e.g., about one, two, or three axes), or any suitable combination thereof.

In some instances, the carrier can include a carrier frame assembly and a carrier actuation assembly. The carrier frame assembly can provide structural support to the payload. The carrier frame assembly can include individual carrier frame components, some of which can be movable relative to one another. The carrier actuation assembly can include one or more actuators (e.g., motors) that actuate movement of the individual carrier frame components. The actuators can permit the movement of multiple carrier frame components simultaneously, or may be configured to permit the movement of a single carrier frame component at a time. The movement of the carrier frame components can produce a corresponding movement of the payload. For example, the carrier actuation assembly can actuate a rotation of one or more carrier frame components about one or more axes of rotation (e.g., roll axis, pitch axis, or yaw axis). The rotation of the one or more carrier frame components can cause a payload to rotate about one or more axes of rotation relative to the movable object. Alternatively or in combination, the carrier actuation assembly can actuate a translation of one or more carrier frame components along one or more axes of translation, and thereby produce a translation of the payload along one or more corresponding axes relative to the movable object.

In some embodiments, the movement of the movable object, carrier, and payload relative to a fixed reference frame (e.g., the surrounding environment) and/or to each other, can be controlled by a terminal. The terminal can be a remote control device at a location distant from the movable object, carrier, and/or payload. The terminal can be disposed on or affixed to a support platform. Alternatively, the terminal can be a handheld or wearable device. For example, the terminal can include a smartphone, tablet, laptop, computer, glasses, gloves, helmet, microphone, or suitable combinations thereof. The terminal can include a user interface, such as a keyboard, mouse, joystick, touchscreen, or display. Any suitable user input can be used to interact with the terminal, such as manually entered commands, voice control, gesture control, or position control (e.g., via a movement, location or tilt of the terminal).

The terminal can be used to control any suitable state of the movable object, carrier, and/or payload. For example, the terminal can be used to control the position and/or orientation of the movable object, carrier, and/or payload relative to a fixed reference from and/or to each other. In some embodiments, the terminal can be used to control individual elements of the movable object, carrier, and/or payload, such as the actuation assembly of the carrier, a sensor of the payload, or an emitter of the payload. The terminal can include a wireless communication device adapted to communicate with one or more of the movable object, carrier, or payload.

The terminal can include a suitable display unit for viewing information of the movable object, carrier, and/or payload. For example, the terminal can be configured to display information of the movable object, carrier, and/or payload with respect to position, translational velocity, translational acceleration, orientation, angular velocity, angular acceleration, or any suitable combinations thereof. In some embodiments, the terminal can display information provided by the payload, such as data provided by a functional payload (e.g., images recorded by a camera or other image capturing device).

Optionally, the same terminal may both control the movable object, carrier, and/or payload, or a state of the movable object, carrier and/or payload, as well as receive and/or display information from the movable object, carrier and/or payload. For example, a terminal may control the positioning of the payload relative to an environment, while displaying image data captured by the payload, or information about the position of the payload. Alternatively, different terminals may be used for different functions. For example, a first terminal may control movement or a state of the movable object, carrier, and/or payload while a second terminal may receive and/or display information from the movable object, carrier, and/or payload. For example, a first terminal may be used to control the positioning of the payload relative to an environment while a second terminal displays image data captured by the payload. Various communication modes may be utilized between a movable object and an integrated terminal that both controls the movable object and receives data, or between the movable object and multiple terminals that both control the movable object and receives data. For example, at least two different communication modes may be formed between the movable object and the terminal that both controls the movable object and receives data from the movable object.

Figure 6:
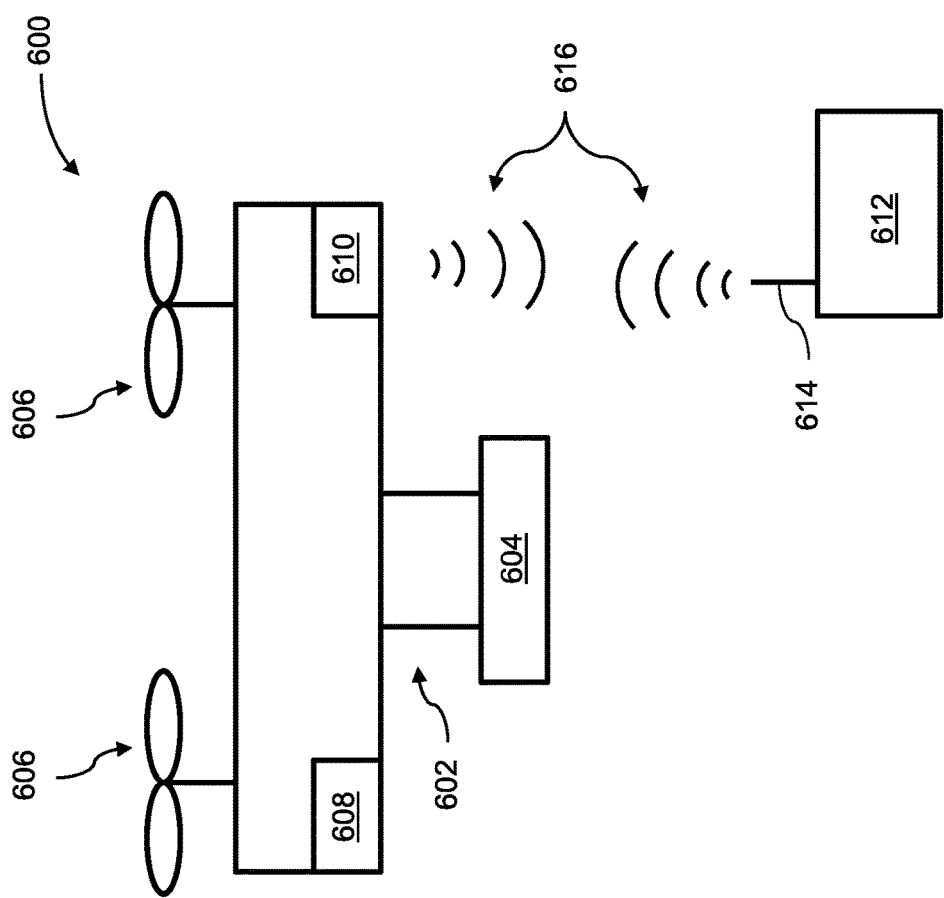
FIG. 6 illustrates a movable object including a carrier and a payload, in accordance with embodiments.

FIG. 6 illustrates a movable object 600 including a carrier 602 and a payload 604, in accordance with embodiments. Although the movable object 600 is depicted as an aircraft, this depiction is not intended to be limiting, and any suitable type of movable object can be used, as previously described herein. One of skill in the art would appreciate that any of the embodiments described herein in the context of aircraft systems can be applied to any suitable movable object (e.g., an UAV). In some instances, the payload 604 may be provided on the movable object 600 without requiring the carrier 602. The movable object 600 may include propulsion mechanisms 606, a sensing system 608, and a communication system 610.

The propulsion mechanisms 606 can include one or more of rotors, propellers, blades, engines, motors, wheels, axles, magnets, or nozzles, as previously described. The movable object may have one or more, two or more, three or more, or four or more propulsion mechanisms. The propulsion mechanisms may all be of the same type. Alternatively, one or more propulsion mechanisms can be different types of propulsion mechanisms. The propulsion mechanisms 606 can be mounted on the movable object 600 using any suitable means. The propulsion mechanisms 606 can be mounted on any suitable portion of the movable object 600, such on the top, bottom, front, back, sides, or suitable combinations thereof.

In some embodiments, the propulsion mechanisms 606 can enable the movable object 600 to take off vertically from a surface or land vertically on a surface without requiring any horizontal movement of the movable object 600 (e.g., without traveling down a runway). Optionally, the propulsion mechanisms 606 can be operable to permit the movable object 600 to hover in the air at a specified position and/or orientation. One or more of the propulsion mechanism 600 may be controlled independently of the other propulsion mechanisms. Alternatively, the propulsion mechanisms 600 can be configured to be controlled simultaneously. For example, the movable object 600 can have multiple horizontally oriented rotors that can provide lift and/or thrust to the movable object. The multiple horizontally oriented rotors can be actuated to provide vertical takeoff, vertical landing, and hovering capabilities to the movable object 600. In some embodiments, one or more of the horizontally oriented rotors may spin in a clockwise direction, while one or more of the horizontally rotors may spin in a counterclockwise direction. For example, the number of clockwise rotors may be equal to the number of counterclockwise rotors. The rotation rate of each of the horizontally oriented rotors can be varied independently in order to control the lift and/or thrust produced by each rotor, and thereby adjust the spatial disposition, velocity, and/or acceleration of the movable object 600 (e.g., with respect to up to three degrees of translation and up to three degrees of rotation).

The sensing system 608 can include one or more sensors that may sense the spatial disposition, velocity, and/or acceleration of the movable object 600 (e.g., with respect to up to three degrees of translation and up to three degrees of rotation). The one or more sensors can include GPS sensors, motion sensors, inertial sensors, proximity sensors, or image sensors. In some instances, the sensing system 608 can include embodiments of the sensing devices previously described herein. The sensing data provided by the sensing system 608 can be used to determine and/or control the spatial disposition, velocity, and/or orientation of the movable object 600 (e.g., using a suitable processing unit and/or control module, as described below). Alternatively, the sensing system 608 can be used to provide data regarding the environment surrounding the movable object, such as weather conditions, proximity to potential obstacles, location of geographical features, location of manmade structures, and the like.

The communication system 610 enables communication with terminal 612 having a communication system 614 via wireless signals 616. The communication systems 610, 614 may include any number of transmitters, receivers, and/or transceivers suitable for wireless communication. The communication may be one-way communication, such that data can be transmitted in only one direction. For example, one-way communication may involve only the movable object 600 transmitting data to the terminal 612, or vice-versa. The data may be transmitted from one or more transmitters of the communication system 610 to one or more receivers of the communication system 612, or vice-versa. Alternatively, the communication may be two-way communication, such that data can be transmitted in both directions between the movable object 600 and the terminal 612. The two-way communication can involve transmitting data from one or more transmitters of the communication system 610 to one or more receivers of the communication system 614, and vice-versa.

In some embodiments, the terminal 612 can provide control data to one or more of the movable object 600, carrier 602, and payload 604 and receive information from one or more of the movable object 600, carrier 602, and payload 604 (e.g., position and/or motion information of the movable object, carrier or payload; data sensed by the payload such as image data captured by a payload camera). In some instances, control data from the terminal may include instructions for relative positions, movements, actuations, or controls of the movable object, carrier and/or payload. For example, the control data may result in a modification of the location and/or orientation of the movable object (e.g., via control of the propulsion mechanisms 606), or a movement of the payload with respect to the movable object (e.g., via control of the carrier 602). The control data from the terminal may result in control of the payload, such as control of the operation of a camera or other image capturing device (e.g., taking still or moving pictures, zooming in or out, turning on or off, switching imaging modes, change image resolution, changing focus, changing depth of field, changing exposure time, changing viewing angle or field of view). In some instances, the communications from the movable object, carrier and/or payload may include information from one or more sensors (e.g., of the sensing system 608 or of the payload 604). The communications may include sensed information from one or more different types of sensors (e.g., GPS sensors, motion sensors, inertial sensor, proximity sensors, or image sensors). Such information may pertain to the position (e.g., location, orientation), movement, or acceleration of the movable object, carrier and/or payload. Such information from a payload may include data captured by the payload or a sensed state of the payload. The control data provided transmitted by the terminal 612 can be configured to control a state of one or more of the movable object 600, carrier 602, or payload 604. Alternatively or in combination, the carrier 602 and payload 604 can also each include a communication module configured to communicate with terminal 612, such that the terminal can communicate with and control each of the movable object 600, carrier 602, and payload 604 independently.

In some embodiments, the movable object 600 can be configured to communicate with another remote device in addition to the terminal 612, or instead of the terminal 612. The terminal 612 may also be configured to communicate with another remote device as well as the movable object 600. For example, the movable object 600 and/or terminal 612 may communicate with another movable object, or a carrier or payload of another movable object. When desired, the remote device may be a second terminal or other computing device (e.g., computer, laptop, tablet, smartphone, or other mobile device). The remote device can be configured to transmit data to the movable object 600, receive data from the movable object 600, transmit data to the terminal 612, and/or receive data from the terminal 612. Optionally, the remote device can be connected to the Internet or other telecommunications network, such that data received from the movable object 600 and/or terminal 612 can be uploaded to a website or server.

Figure 7:
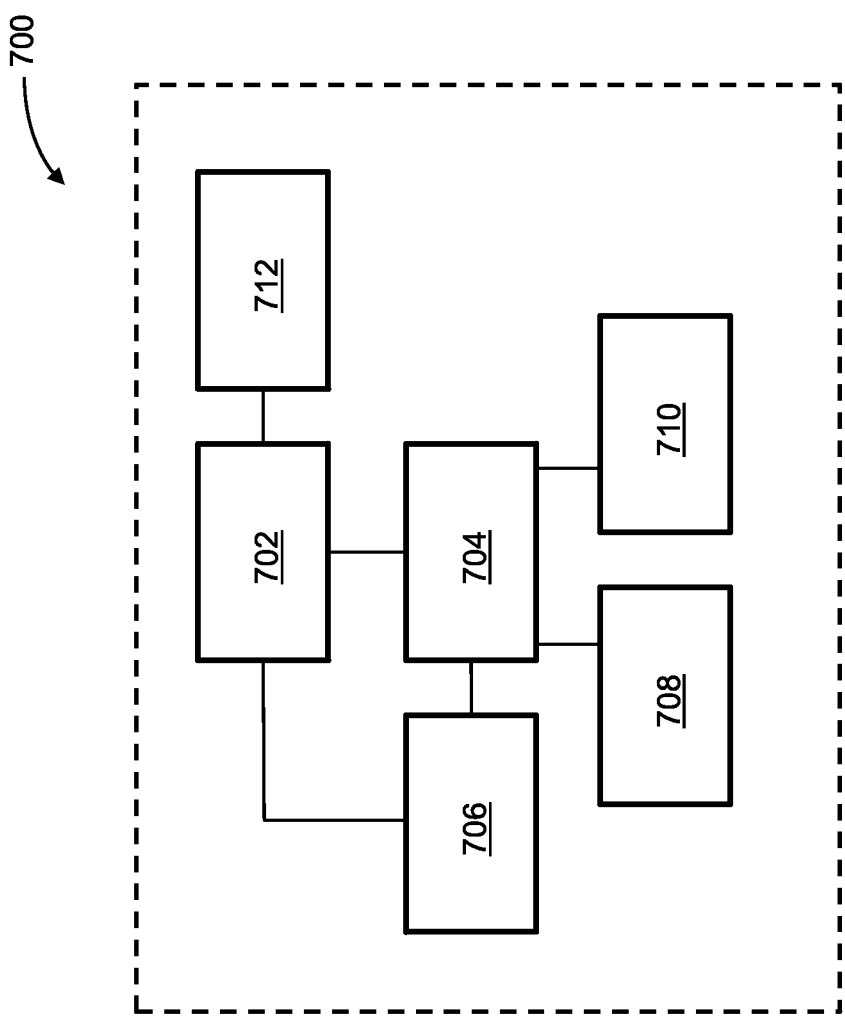
FIG. 7 is a schematic illustration by way of block diagram of a system for controlling a movable object, in accordance with embodiments.

FIG. 7 is a schematic illustration by way of block diagram of a system 700 for controlling a movable object, in accordance with embodiments. The system 700 can be used in combination with any suitable embodiment of the systems, devices, and methods disclosed herein. The system 700 can include a sensing module 702, processing unit 704, non-transitory computer readable medium 706, control module 708, and communication module 710.

The sensing module 702 can utilize different types of sensors that collect information relating to the movable objects in different ways. Different types of sensors may sense different types of signals or signals from different sources. For example, the sensors can include inertial sensors, GPS sensors, proximity sensors (e.g., lidar), or vision/image sensors (e.g., a camera). The sensing module 702 can include any suitable embodiment of the sensing devices previously described herein. The sensing module 702 can be operatively coupled to a processing unit 704 having a plurality of processors. In some embodiments, the sensing module can be operatively coupled to a transmission module 712 (e.g., a Wi-Fi image transmission module) configured to directly transmit sensing data to a suitable external device or system. For example, the transmission module 712 can be used to transmit images captured by a camera of the sensing module 702 to a remote terminal.

The processing unit 704 can have one or more processors, such as a programmable processor (e.g., a central processing unit (CPU)). The processing unit 704 can be operatively coupled to a non-transitory computer readable medium 706. The non-transitory computer readable medium 706 can store logic, code, and/or program instructions executable by the processing unit 704 for performing one or more steps. The non-transitory computer readable medium can include one or more memory units (e.g., removable media or external storage such as an SD card or random access memory (RAM)). In some embodiments, data from the sensing module 702 can be directly conveyed to and stored within the memory units of the non-transitory computer readable medium 706. The memory units of the non-transitory computer readable medium 706 can store logic, code and/or program instructions executable by the processing unit 704 to perform any suitable embodiment of the methods described herein. For example, the processing unit 704 can be configured to execute instructions causing one or more processors of the processing unit 704 to analyze sensing data produced by the sensing module. The memory units can store sensing data from the sensing module to be processed by the processing unit 704. In some embodiments, the memory units of the non-transitory computer readable medium 706 can be used to store the processing results produced by the processing unit 704.

In some embodiments, the processing unit 704 can be operatively coupled to a control module 708 configured to control a state of the movable object. For example, the control module 708 can be configured to control the propulsion mechanisms of the movable object to adjust the spatial disposition, velocity, and/or acceleration of the movable object with respect to six degrees of freedom. Alternatively or in combination, the control module 708 can control one or more of a state of a carrier, payload, or sensing module.

The processing unit 704 can be operatively coupled to a communication module 710 configured to transmit and/or receive data from one or more external devices (e.g., a terminal, display device, or other remote controller). Any suitable means of communication can be used, such as wired communication or wireless communication. For example, the communication module 710 can utilize one or more of local area networks (LAN), wide area networks (WAN), infrared, radio, WiFi, point-to-point (P2P) networks, telecommunication networks, cloud communication, and the like. Optionally, relay stations, such as towers, satellites, or mobile stations, can be used. Wireless communications can be proximity dependent or proximity independent. In some embodiments, line-of-sight may or may not be required for communications. The communication module 710 can transmit and/or receive one or more of sensing data from the sensing module 702, processing results produced by the processing unit 704, predetermined control data, user commands from a terminal or remote controller, and the like.

The components of the system 700 can be arranged in any suitable configuration. For example, one or more of the components of the system 700 can be located on the movable object, carrier, payload, terminal, sensing system, or an additional external device in communication with one or more of the above. Additionally, although FIG. 7 depicts a single processing unit 704 and a single non-transitory computer readable medium 706, one of skill in the art would appreciate that this is not intended to be limiting, and that the system 700 can include a plurality of processing units and/or non-transitory computer readable media. In some embodiments, one or more of the plurality of processing units and/or non-transitory computer readable media can be situated at different locations, such as on the movable object, carrier, payload, terminal, sensing module, additional external device in communication with one or more of the above, or suitable combinations thereof, such that any suitable aspect of the processing and/or memory functions performed by the system 700 can occur at one or more of the aforementioned locations.

While preferred embodiments of the present invention have been shown and described herein, it will be obvious to those skilled in the art that such embodiments are provided by way of example only. Numerous variations, changes, and substitutions will now occur to those skilled in the art without departing from the invention. It should be understood that various alternatives to the embodiments of the invention described herein may be employed in practicing the invention. It is intended that the following claims define the scope of the invention and that methods and structures within the scope of these claims and their equivalents be covered thereby.

What is claimed is:

1. An apparatus for determining a spatial disposition of a movable object, the apparatus comprising:
a support base configured to be carried by a movable object;
one or more accelerometers coupled to the support base via a first damping element configured to damp motion of the one or more accelerometers; and
one or more gyroscopes coupled to the support base via a second damping element configured to damp motion of the one or more gyroscopes, wherein an amount of motion damping provided by the first damping element is greater than an amount of motion damping provided by the second damping element.

2. The apparatus of claim 1, wherein the movable object is an unmanned aerial vehicle (UAV).

3. The apparatus of claim 1, wherein the one or more accelerometers are microelectromechanical system (MEMS) accelerometers, and wherein the one or more gyroscopes are MEMS gyroscopes.

4. The apparatus of claim 1, wherein at least one of the first or second damping elements comprises a sponge, a foam, or a rubber material.

5. The apparatus of claim 1, wherein the stiffness of the first damping element is less than the stiffness of the second damping element.

6. The apparatus of claim 5, wherein the stiffness of the first damping element is selected to reduce noise associated with a signal produced by the one or more accelerometers, and the stiffness of the second damping element is selected to reduce noise associated with a signal produced by the one or more gyroscopes.

7. An apparatus for determining a spatial disposition of a movable object, the apparatus comprising:
a support base configured to be carried by a movable object;
a plurality of inertial measurement units each comprising at least one accelerometer and at least one gyroscope; and
a plurality of damping elements each coupling at least one of the plurality of inertial measurement units to the support base so as to damp motion of the at least one of the plurality of inertial measurement units.

8. The apparatus of claim 7, wherein at least some of the plurality of damping elements provide different amounts of motion damping.

9. The apparatus of claim 7, wherein at least one of the plurality of damping elements comprises a sponge, a foam, or a rubber material.

10. The apparatus of claim 7, wherein at least one of the plurality of damping elements is coupled to more than one of the plurality of inertial measurement units.

11. The apparatus of claim 7, further comprising a processing unit configured to receive a signal indicative of an acceleration and/or rotation of the movable object from each of the plurality of inertial measurement units, and process the received signals to determine the acceleration and/or rotation of the movable object.

12. The apparatus of claim 11, wherein the processing unit processes the received signals using a redundancy method.

13. The apparatus of claim 11, wherein the processing unit processes the received signals by averaging the received signals.

14. The apparatus of claim 11, wherein the plurality of inertial measurement units includes a first inertial measurement unit and a second inertial measurement unit, and wherein the received signals include a first signal received from the at least one accelerometer of the first inertial measurement unit, and a second signal received from the at least one gyroscope of the second inertial measurement unit.

15. The apparatus of claim 14, wherein the first signal is indicative of the acceleration of the movable object with respect to up to three axes of motion and the second signal is indicative of the rotation of the movable object with respect to up to three axes of rotation.

16. The apparatus of claim 14, wherein the plurality of damping elements includes a first damping element and a second damping element, and wherein the first inertial measurement unit is coupled to the support base via the first damping element and the second inertial measurement unit is coupled to the support base via the second damping element.

17. The apparatus of claim 16, wherein the first damping element provides a greater amount of motion damping than the second damping element.

18. An apparatus for determining a spatial disposition of a movable object, the apparatus comprising:
a support base configured to be carried by a movable object;
one or more accelerometers coupled to the support base via a damping element configured to damp motion of the one or more accelerometers; and
one or more gyroscopes directly coupled to the support base.

19. The apparatus of claim 18, wherein the damping element comprises a sponge, a foam, or a rubber material.

20. The apparatus of claim 18, wherein the damping element is configured to damp vibrations of the one or more accelerometers.

* * * * *